(12) United States Patent
Cavaliere et al.

(10) Patent No.: US 10,611,013 B2
(45) Date of Patent: Apr. 7, 2020

(54) MULTIPLE PURPOSE TOOL ASSEMBLY

(71) Applicants: Frank Cavaliere, Melbourne, FL (US); Sheri Taylor, Melbourne, FL (US)

(72) Inventors: Frank Cavaliere, Melbourne, FL (US); Sheri Taylor, Melbourne, FL (US)

(*) Notice: Subject to any disclaimer, the term of this patent is extended or adjusted under 35 U.S.C. 154(b) by 0 days.

(21) Appl. No.: 16/124,321

(22) Filed: Sep. 7, 2018

(65) Prior Publication Data

US 2020/0078924 A1 Mar. 12, 2020

(51) Int. Cl.
| | |
|---|---|
| *B25G 1/04* | (2006.01) |
| *B25G 3/02* | (2006.01) |
| *A63B 53/00* | (2015.01) |
| *A63B 53/02* | (2015.01) |
| *A63B 53/14* | (2015.01) |
| *A01B 1/02* | (2006.01) |
| *A01B 1/22* | (2006.01) |
| *A46B 7/04* | (2006.01) |
| *A63B 60/00* | (2015.01) |

(52) U.S. Cl.
CPC ............ *B25G 1/04* (2013.01); *B25G 3/02* (2013.01); *A01B 1/022* (2013.01); *A01B 1/22* (2013.01); *A46B 7/046* (2013.01); *A46B 2200/302* (2013.01); *A63B 53/007* (2013.01); *A63B 53/02* (2013.01); *A63B 53/14* (2013.01); *A63B 2060/0085* (2015.10)

(58) Field of Classification Search
CPC .... A47L 9/32; B25G 1/04; B25G 3/02; B25G 3/12; B25G 3/18; B25G 3/04; B05C 17/0205; F16B 7/10; F16B 7/105; F16B 7/042; B21D 39/04; B21D 39/046; B21D 39/048; A63B 2060/0085; A63B 53/007; A63B 53/02; A63B 53/14; A01B 1/022; A01B 1/22; A46B 7/046; A46B 2200/302; Y10T 16/473; Y10T 16/4719; Y10T 16/498; Y10T 16/4554; Y10T 403/32467; Y10T 403/598; Y10T 403/7079; Y10T 403/32475; Y10T 15/10
See application file for complete search history.

(56) References Cited

U.S. PATENT DOCUMENTS

| | | | | |
|---|---|---|---|---|
| 5,133,553 | A | * 7/1992 | Divnick | ............... A63B 53/06 473/245 |
| 5,288,161 | A | * 2/1994 | Graves | ............... B05C 17/0205 15/145 |
| D363,519 | S | 10/1995 | Gooden | |
| 5,458,330 | A | 10/1995 | Baum | |
| 5,682,641 | A | * 11/1997 | Newman, Jr. | ....... B05C 17/0205 15/144.4 |
| 5,729,865 | A | * 3/1998 | Stoddart | ............ B05C 17/0205 16/429 |

(Continued)

*Primary Examiner* — Chuck Y Mah

(57) ABSTRACT

A multiple purpose tool assembly for attaching a variety of implements to a handle includes a handle and a rod that is removably coupled to the handle. The rod has a first portion that is slidably coupled to a second portion such that the rod has a telescopically adjustable length. A lock is removably coupled to the second section of the rod. The lock is biased into a locking position for retaining the rod at a selected length. Additionally, the lock is urgeable into an unlocked position thereby facilitating the length of the rod to be adjusted. A plurality of attachments is each selectively and removably attached to the rod for performing specific tasks.

9 Claims, 4 Drawing Sheets

(56) References Cited

U.S. PATENT DOCUMENTS

| | | | | |
|---|---|---|---|---|
| 5,983,455 A * | 11/1999 | Polzin | ................ | B05C 17/0205 |
| | | | | 15/144.4 |
| 6,199,245 B1 * | 3/2001 | Blessing | ................ | B25G 1/06 |
| | | | | 16/422 |
| 6,213,672 B1 * | 4/2001 | Varga | ................ | A47L 13/20 |
| | | | | 15/144.4 |
| 6,435,754 B1 * | 8/2002 | Canale | ................ | A47L 9/244 |
| | | | | 403/109.2 |
| 6,832,784 B1 * | 12/2004 | Chen | ................ | A47L 9/244 |
| | | | | 285/303 |
| 7,025,383 B2 * | 4/2006 | Canale | ................ | A47L 9/244 |
| | | | | 285/302 |
| D555,350 S | 11/2007 | Graves | | |
| 7,320,647 B2 | 1/2008 | Muirray | | |
| 7,510,482 B2 | 3/2009 | Benson | | |
| 7,654,275 B2 | 2/2010 | Ewell | | |
| 8,776,648 B2 * | 7/2014 | Lee | ................ | B25G 1/102 |
| | | | | 16/426 |
| 8,919,362 B1 | 12/2014 | Mortenson | | |
| 2001/0024594 A1 * | 9/2001 | Taylor | ................ | B25G 1/04 |
| | | | | 403/109.7 |
| 2001/0047570 A1 * | 12/2001 | Lanz | ................ | B25G 1/04 |
| | | | | 16/429 |
| 2002/0088091 A1 * | 7/2002 | Grote | ................ | B05C 17/0205 |
| | | | | 16/429 |
| 2006/0230581 A1 * | 10/2006 | Richardson | ................ | B25G 1/04 |
| | | | | 16/429 |
| 2007/0155545 A1 | 7/2007 | Owen | | |
| 2008/0276429 A1 * | 11/2008 | Bukovitz | ................ | B25G 3/14 |
| | | | | 16/429 |
| 2009/0106919 A1 * | 4/2009 | Montgomery | ................ | A46B 5/005 |
| | | | | 15/105 |
| 2010/0102584 A1 * | 4/2010 | Sanchez | ................ | B25G 1/04 |
| | | | | 294/51 |
| 2013/0074279 A1 * | 3/2013 | Bridges | ................ | B25G 1/04 |
| | | | | 15/144.4 |
| 2013/0281224 A1 | 10/2013 | Zabala Scharpp | | |
| 2014/0215738 A1 * | 8/2014 | Hagans | ................ | B25G 1/06 |
| | | | | 15/144.2 |
| 2015/0258674 A1 * | 9/2015 | Steinick | ................ | B25G 1/102 |
| | | | | 16/421 |

\* cited by examiner

MULTIPLE PURPOSE TOOL ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tool devices and more particularly pertains to a new tool device for attaching a variety of implements to a handle.

BRIEF SUMMARY OF THE INVENTION

An embodiment of the disclosure meets the needs presented above by generally comprising a handle and a rod that is removably coupled to the handle. The rod has a first portion that is slidably coupled to a second portion such that the rod has a telescopically adjustable length. A lock is removably coupled to the second section of the rod. The lock is biased into a locking position for retaining the rod at a selected length. Additionally, the lock is urgeable into an unlocked position thereby facilitating the length of the rod to be adjusted. A plurality of attachments is each selectively and removably attached to the rod for performing specific tasks.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
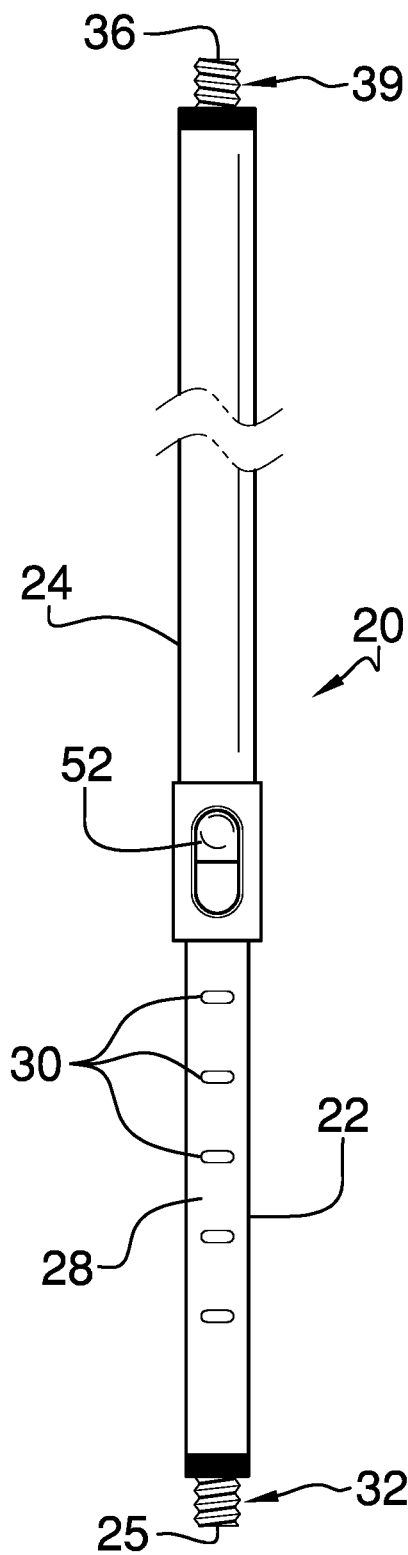
FIG. 1 is a perspective view of a plurality of attachments of a multiple purpose tool assembly according to an embodiment of the disclosure.
Figure 2:
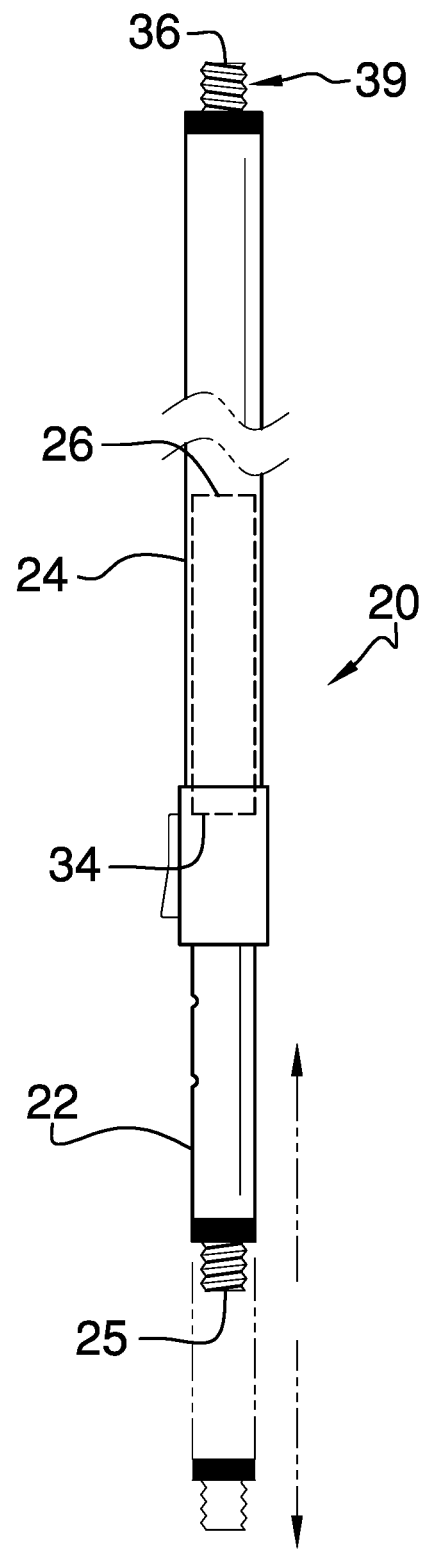
FIG. 2 is a perspective view of a plurality of attachments of an embodiment of the disclosure.
Figure 3:
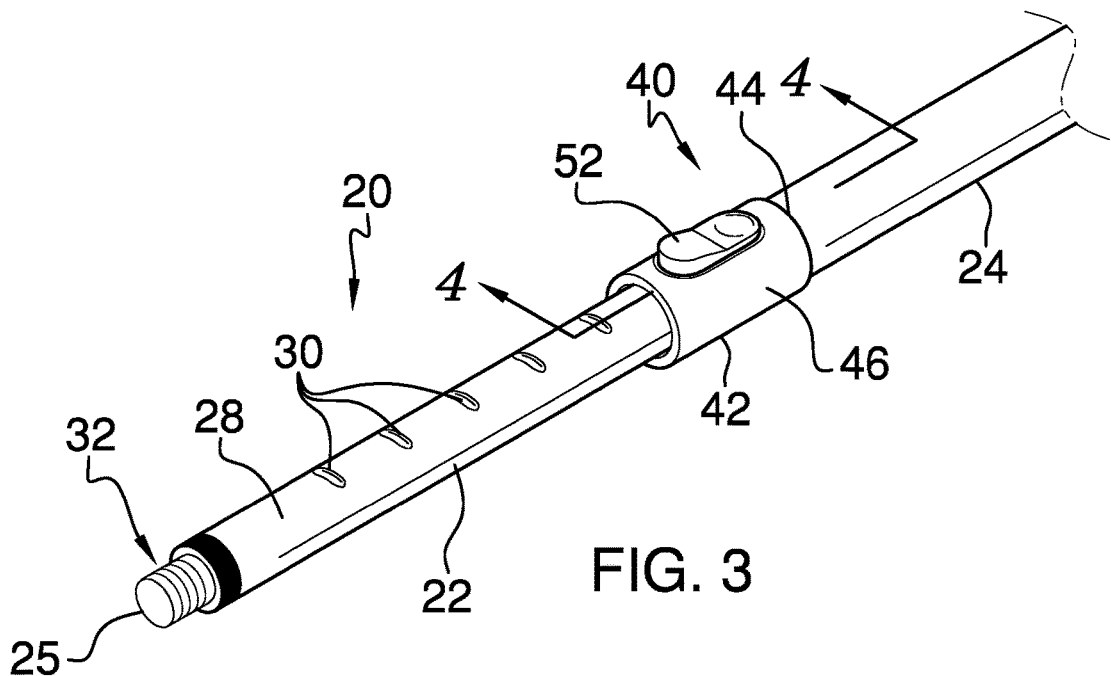
FIG. 3 is a perspective view of a plurality of attachments of an embodiment of the disclosure.
Figure 4:
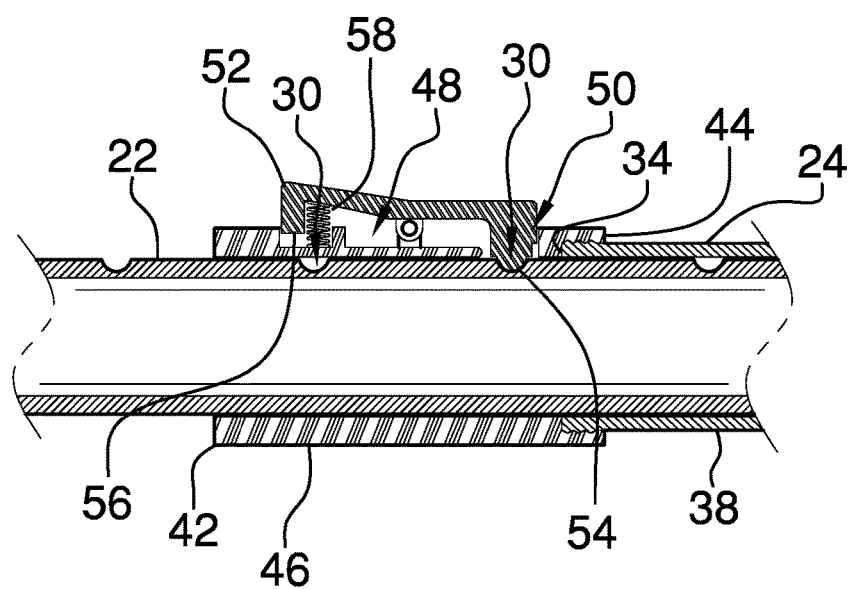
FIG. 4 is a perspective view of a handle of an embodiment of the disclosure.
Figure 5:
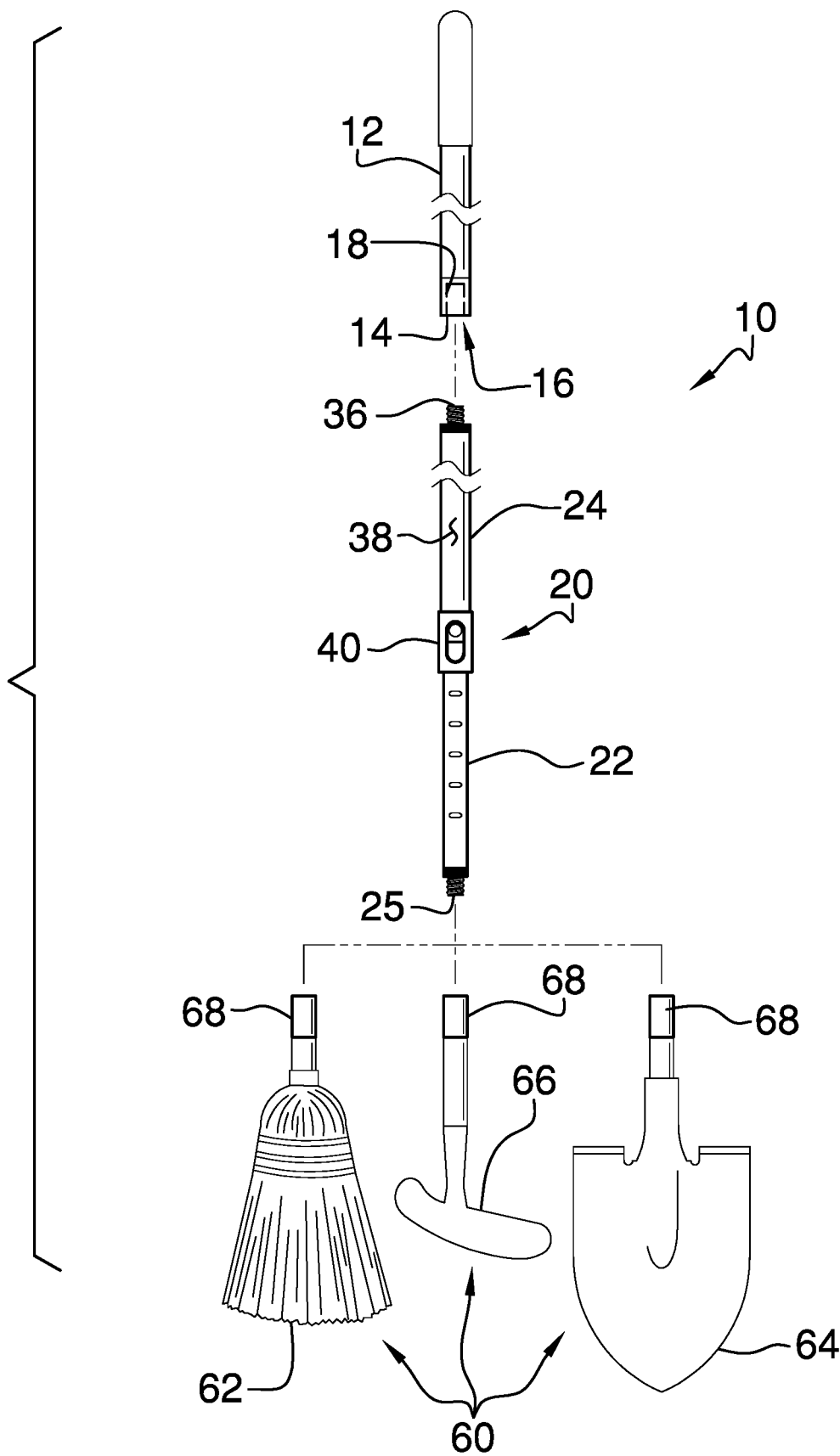
FIG. 5 is a perspective view of an attachment of an embodiment of the disclosure.
Figure 6:
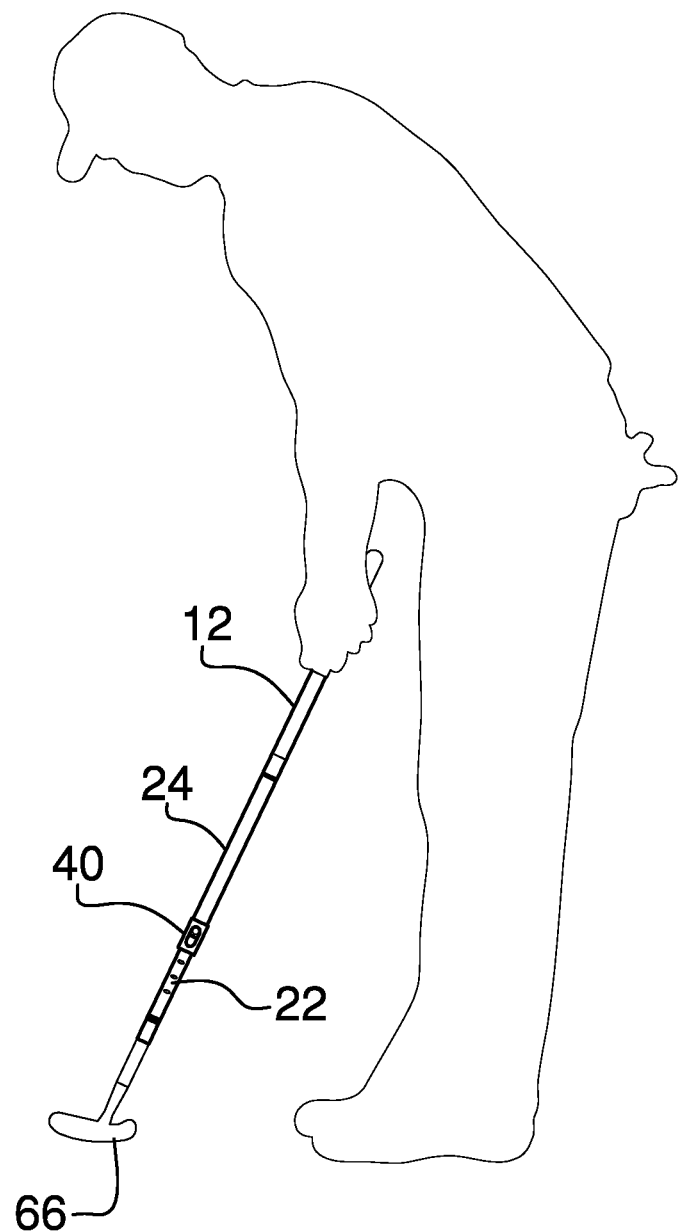
FIG. 6 is a perspective view of an embodiment of the disclosure.

With reference now to the drawings, and in particular to FIGS. 1 through 6 thereof, a new tool device embodying the principles and concepts of an embodiment of the disclosure and generally designated by the reference numeral 10 will be described.

As best illustrated in FIGS. 1 through 6, the multiple purpose tool assembly 10 generally comprises a handle 12 that is gripped. The handle 12 has a first end 14 and the first end 14 has a well 16 extending downwardly therein. The well 16 has a bounding surface 18 and the bounding surface 18 is threaded. The handle 12 may have a length ranging between approximately 50.0 cm and 75.0 cm.

A rod 20 is provided and the rod 20 is removably coupled to the handle 12. The rod 20 has a first portion 22 that is slidably coupled to a second portion 24 such that the rod 20 has a telescopically adjustable length. The first portion 22 has a primary end 25, a secondary end 26 and an outer wall 28 extending therebetween. The outer wall 28 has a plurality of indentations 30 extending therein and the indentations 30 are spaced apart from each other and are distributed between the primary end 25 and the secondary end 26. Additionally, the outer wall 28 of the first portion 22 has a threaded portion 32 extending from the primary end 25 toward the secondary end 26.

The second portion 24 has a first end 34, a second end 36 and an outer surface 38 extending therebetween. The first end 34 of the second portion 24 insertably receives the secondary end 26 of the first portion 22. Additionally, the outer surface 38 has a threaded portion 39 extending from the first end 34 of the second portion 24 towards the second end 36 of the second portion 24. The threaded portion 39 of the second portion 24 threadably engages the bounding surface 18 of the well 16 in the handle 12 such that the second portion 24 is removably attached to the handle 12.

A lock 40 is removably coupled to the second portion 24 of the rod 20 and the lock 40 is biased into a locking position for retaining the rod 20 at a selected length. The lock 40 is urgeable into an unlocked position thereby facilitating the length of the rod 20 to be adjusted. The lock 40 comprises a sleeve 42 that has a back end 44 and an outer wall 46, and the outer wall 46 of the sleeve has a rocker well 48 extending inward therein. Additionally, the outer wall 28 has an aperture 50 extending therethrough and the aperture 50 is positioned in the rocker well 48. The back end 44 of the sleeve 42 threadably engages the first end 34 of the second portion 24 of the rod 20 having the sleeve 42 being oriented collinear with the second portion 24.

A rocker 52 is provided that has a first foot 54 and a second foot 56 each extending downwardly therefrom. The first foot 54 is spaced apart from the second foot 56 and the rocker 52 is pivotally coupled to the sleeve 42. Moreover, the rocker 52 is positioned in the rocker well 48 having the first foot 54 being aligned with the aperture 50. The rocker 52 is pivotable between a first position and a second position. The first foot 54 passes through the aperture 50 and engages a selected one of the indentations 30 in the first portion 22 of the rod 20 to retain the rod 20 at the selected length when the rocker 52 is in the first position. The rocker 52 is pivoted thereby lifting the first foot 54 upwardly to disengage the indentations 30 when the rocker 52 is urged into the second position. Thus, the first portion 22 is slidable in the second portion 24 when the rocker 52 is in the second position.

A biasing member 58 is positioned between the sleeve 42 and the rocker 52. The biasing member 58 is aligned with the second foot 56. Thus, the biasing member 58 biasing the rocker 52 into the first position. The biasing member 58 may comprise a spring or the like.

A plurality of attachments 60 is included and each of the attachments 60 is removably attached to the rod 20 for performing specific tasks. The plurality of attachments 60 at least includes a broom 62 for sweeping, a shovel 64 for digging and a putter 66 for putting in golf. Each of the attachments 60 has a receiver 68 thereon. The receiver 68 on a selected one of the attachments 60 threadably engages the threaded portion 32 of the first portion 22 of the rod 20 to releasably retain the selected attachment on the rod 20.

In use, the receiver 68 on a selected one of the attachments 60 is threadably coupled to the first portion 22 of the rod 20. The rocker 52 is urged into the second position to allow the first portion 22 to slide in the second portion 24. Thus, the length of the rod 20 can be adjusted to a user's preference. The rocker 52 is biased into the second position when the rocker 52 is not manipulated and engages a selected one of the indentations 30 in the first portion 22 to retain the rod 20 at the selected length. In this way the rod 20 facilitate users of varying heights to comfortably employ the handle 12 and the selected attachment 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A multiple purpose tool assembly having a plurality of telescopic attachments being removably coupled thereto, said assembly comprising:
    a handle being configured to be gripped;
    a rod being removably coupled to said handle, said rod having a first portion being slidably coupled to a second portion such that said rod has a telescopically adjustable length;
    a lock being removably coupled to said second portion of said rod, said lock being biased into a locking position engaging said first portion for retaining said rod at a selected length, said lock being urgeable into an unlocked position disengaging from said first portion thereby facilitating the length of said rod to be adjusted; and
    a plurality of attachments, each of said attachments being removably attached to said rod wherein each of said attachments is configured to perform specific tasks, said plurality of attachments at least including a broom for sweeping, a shovel for digging and a putter for putting in golf.

2. The assembly according to claim 1, wherein said handle has a first end, said first end having a well extending inwardly therein, said well having a bounding surface, said bounding surface being threaded.

3. The assembly according to claim 2, wherein said first portion of said rod has a primary end, a secondary end and an outer wall extending therebetween, said outer wall having a plurality of indentations extending toward an interior of said first portion, said indentations being spaced apart from each other and being distributed between said primary end and said secondary end, said outer wall of said first portion having a threaded portion extending from said primary end toward said secondary end.

4. The assembly according to claim 3, wherein said second portion has a first end, a second end and an outer surface extending therebetween, said first end of said second portion insertably receiving said secondary end of said first portion, said outer surface having a threaded portion extending from said second end of said second portion towards said first end of said second portion, said threaded portion of said second portion threadably engaging said bounding surface of said well in said handle such that said second portion is removably attached to said handle.

5. The assembly according to claim 4, wherein:
    said lock comprises
        a sleeve having a back end and an outer wall, and
        a rocker having a first foot and a second foot each extending downwardly therefrom, said first foot being spaced apart from said second foot, said rocker being pivotally coupled to said sleeve, said rocker being pivotable between a first position and a second position;
    said outer wall has a rocker well extending inward therein;
    said outer wall has an aperture extending therethrough, said aperture being positioned in said rocker well, said rocker being positioned in said rocker well having said first foot being aligned with said aperture; and
    said back end of said sleeve threadably engages said first end of said second portion of said rod having said sleeve being oriented collinear with said second portion.

6. The assembly according to claim 5, wherein said first foot passes through said aperture and engages a selected one of said indentations in said first portion of said rod to retain said rod at said selected length when said rocker is in said first position, said rocker being pivoted thereby lifting said first foot upwardly to disengage said indentations thereby facilitating said first portion to be slidable in said second portion.

7. The assembly according to claim 6, further comprising a biasing member being positioned between said sleeve and said rocker, said biasing member being aligned with said second foot, said biasing member biasing said rocker into said first position.

8. The assembly according to claim 3, wherein each of said attachments has a receiver thereon, said receiver on a selected one of said attachments threadably engaging said threaded portion of said first portion of said rod to releasably retain said selected attachment on said rod.

9. A multiple purpose tool assembly having a plurality of telescopic attachments being removably coupled thereto, said assembly comprising:
   a handle being configured to be gripped, said handle having a first end, said first end having a well extending inwardly therein, said well having a bounding surface, said bounding surface being threaded;
   a rod being removably coupled to said handle, said rod having a first portion being slidably coupled to a second portion such that said rod has a telescopically adjustable length, said first portion having a primary end, a secondary end and an outer wall extending therebetween, said outer wall having a plurality of indentations extending therein, said indentations being spaced apart from each other and being distributed between said primary end and said secondary end, said second portion having a first end, a second end and an outer surface extending therebetween, said first end of said second portion insertably receiving said secondary end of said first portion, said outer surface having a threaded portion extending from said second end of said second portion towards said first end of said second portion, said threaded portion of said second portion threadably engaging said bounding surface of said well in said handle such that said second portion is removably attached to said handle, said outer wall of said first portion having a threaded portion extending from said primary end toward said secondary end;
   a lock being removably coupled to said second section of said rod, said lock being biased into a locking position for retaining said rod at a selected length, said lock being urgeable into an unlocked position thereby facilitating the length of said rod to be adjusted, said lock comprising;
   a sleeve having a back end and an outer wall, said outer wall having a rocker well extending inward therein, said outer wall having an aperture extending therethrough, said aperture being positioned in said well, said back end of said sleeve threadably engaging said first end of said second portion of said rod having said sleeve being oriented collinear with said second portion;
   a rocker having a first foot and a second foot each extending downwardly therefrom, said first foot being spaced apart from said second foot, said rocker being pivotally coupled to said sleeve, said rocker being positioned in said well having said first foot being aligned with said aperture, said rocker being pivotable between a first position and a second position, said first foot passing through said aperture and engaging a selected one of said indentations in said first portion of said rod to retain said rod at said selected length when said rocker is in said first position, said rocker being pivoted thereby lifting said first foot upwardly to disengage said indentations thereby facilitating said first portion to be slidable in said second portion; and
   a biasing member being positioned between said sleeve and said rocker, said biasing member being aligned with said second foot, said biasing member biasing said rocker into said first position;
a plurality of attachments, each of said attachments being removably attached to said rod wherein each of said attachments is configured to perform specific tasks, said plurality of attachments at least including a broom for sweeping, a shovel for digging and a putter for putting in golf, each of said attachments having a receiver thereon, said receiver on a selected one of said attachments threadably engaging said threaded portion of said first portion of said rod to releasably retain said selected attachment on said rod.

\* \* \* \* \*